United States Patent
Roozbeh et al.

(10) Patent No.: US 11,720,388 B2
(45) Date of Patent: Aug. 8, 2023

(54) MANAGEMENT OF DYNAMIC SHARING OF CENTRAL PROCESSING UNITS

(71) Applicant: Telefonaktiebolaget LM Ericsson (publ), Stockholm (SE)

(72) Inventors: Amir Roozbeh, Kista (SE); Mozhgan Mahloo, Solna (SE); Joao Monteiro Soares, Solna (SE); Daniel Turull, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 388 days.

(21) Appl. No.: 16/960,973

(22) PCT Filed: Jan. 15, 2018

(86) PCT No.: PCT/SE2018/050032
§ 371 (c)(1),
(2) Date: Jul. 9, 2020

(87) PCT Pub. No.: WO2019/139515
PCT Pub. Date: Jul. 18, 2019

(65) Prior Publication Data
US 2020/0334070 A1    Oct. 22, 2020

(51) Int. Cl.
G06F 9/455    (2018.01)
G06F 9/50     (2006.01)
G06F 9/54     (2006.01)

(52) U.S. Cl.
CPC ........ G06F 9/45558 (2013.01); G06F 9/5072 (2013.01); G06F 9/541 (2013.01);
(Continued)

(58) Field of Classification Search
CPC .... G06F 9/45558; G06F 9/5072; G06F 9/541; G06F 2009/4557; G06F 2009/45595
See application file for complete search history.

(56) References Cited

U.S. PATENT DOCUMENTS

| | | | | |
|---|---|---|---|---|
| 4,807,111 A | * | 2/1989 | Cohen | G06F 9/4881 710/54 |
| 7,080,378 B1 | * | 7/2006 | Noland | G06F 9/5083 709/224 |

(Continued)

FOREIGN PATENT DOCUMENTS

WO    2017102038 A1    6/2017

OTHER PUBLICATIONS

International Search Report and the Written Opinion of the International Searching Authority, issued in corresponding International Application No. PCT/SE2018/050032, dated Nov. 27, 2018, 13 pages.

*Primary Examiner* — Emerson C Puente
*Assistant Examiner* — Jonathan R Labud
(74) *Attorney, Agent, or Firm* — Rothwell, Figg, Ernst & Manbeck, P.C.

(57) ABSTRACT

It is disclosed a resource sharing manager, RSM, operative to provide efficient utilization of central processing units, CPUs, within virtual servers, each virtual server having an operating system, OS. The RSM dynamically obtains (902) information about ownership and sharable status of said CPUs, and dynamically determines (904) which CPUs are sharable to which virtual servers. The RSM obtains (906) information about that one or more sharable CPUs are available; and obtains (908) information about that one or more virtual servers require more processing resources. The RSM also assigns (910) a first CPU of said sharable CPUs when available, to a first virtual server of said virtual servers. Information about ownership and sharable status of the first CPU, is hence provided to the OS of the first virtual server. Overhead is reduced by circumventing a hypervisor when sharing CPUs in virtual servers. An increase in efficiency of task execution is provided.

16 Claims, 6 Drawing Sheets

(52) U.S. Cl.
CPC ........... *G06F 2009/4557* (2013.01); *G06F 2009/45595* (2013.01)

(56) References Cited

U.S. PATENT DOCUMENTS

| | | | |
|---|---|---|---|
| 8,261,268 B1* | 9/2012 | Forgette | G06F 9/45558 |
| | | | 718/1 |
| 2003/0115244 A1* | 6/2003 | Molloy | G06F 11/3495 |
| | | | 714/E11.202 |
| 2011/0276982 A1* | 11/2011 | Nakayama | H04L 67/101 |
| | | | 718/105 |
| 2011/0296407 A1 | 12/2011 | Bhandari et al. | |
| 2015/0134824 A1 | 5/2015 | Mickens et al. | |
| 2017/0075711 A1 | 3/2017 | Berrangé | |
| 2018/0189370 A1* | 7/2018 | Bendel | G06F 16/27 |

\* cited by examiner

MANAGEMENT OF DYNAMIC SHARING OF CENTRAL PROCESSING UNITS

CROSS REFERENCE TO RELATED APPLICATION(S)

This application is a 35 U.S.C. § 371 National Phase Entry Application from PCT/SE2018/050032, filed Jan. 15, 2018, designating the United States, the disclosure of which is incorporated herein by reference in its entirety.

TECHNICAL FIELD

This disclosure relates to sharing of central processing units (CPUs). More particularly, it relates to a method, a resource sharing management and a computer program for providing efficient utilization of a plurality of CPUs.

BACKGROUND

A key challenge in data centers (DCs) of today is low resource utilization, as resources that the DC operator pays for are not utilized to their full capacity. DC providers can employ advanced resource scheduling techniques along with container virtualization technology to implement server consolidation, multi-tenant cloud, efficient resource sharing, and improve DC resource utilization, while reducing their costs and provide dynamic scaling to their customers.

Data centers traditionally comprise a number of servers wherein each server contains a single motherboard that may be integrated with various resources.

FIG. 1 schematically presents such various resources in the form of processing units, such as central processing unit (CPU) cores; memory units such as random access memory (RAM) units; networking, such as a network interface card (NIC); and storage units, handled by an input/output handler. The resources are herein interfaced to a DC network (NW) via the NIC.

In order to provide resource sharing and increase of resource utilization data center providers may employ computer virtualization.

Computer virtualization is a technique that abstracts different hardware parts of a computer platform and allows execution of different operating systems.

There are several ways of virtualizing a computational system, where a commonly used way is the one that uses a virtual machine monitor (VMM), sometimes also called hypervisor. The hypervisor may be considered to be a layer of software that provides to a virtual machine the illusion that it is running its own resources. By using such means, multiple operating systems and applications can run on the same server while sharing resources of one and the same physical server.

However, virtualization comes at a cost, i.e., extra overhead, as it interleaves execution of the applications and the execution of the hypervisor/host operating system (OS).

A disaggregated DC is an alternative architecture to traditional DC. In the disaggregated architecture, the DC is composed of a collection of disaggregated resources. In this architecture, DC resources, i.e., compute, memory, storage, and network interface card (NIC), are typically realized as independent modular components. Resource allocation within the disaggregated DC is based on allocations of each of the different resource types, being for instance compute, memory, storage, and networking, from their respective resource pool. A disaggregated architecture allows dynamic composition of logical servers, such as motherboards, by selecting and configuring resources that may be physical, as needed from different resource pools and interconnecting them through an interconnection fabric.

FIG. 2 schematically illustrates system blocks of a disaggregated computational architecture. Each host 200 runs a host operating system (OS) 201 on its own for the computational instances 202, 203, 204.

Via a fast interconnect 206 various resources are provided to individual virtual motherboards 205. Computational resources are comprised of multiple CPU pools 210, where each CPU pool comprises multiple CPUs 211.

Similarly the resources comprise one or more memory pool 220, each having a multiple of memory units or memories 221. Also, the resources also comprise one or more storage pools 230, each having one or more disks 231.

Portions of each CPU pool, memory pool and storage pool are thus assigned to individual hosts via the virtual motherboards. The virtual motherboards have assigned resources from different resource pools.

Each host 200 can use the resources assigned to each virtual motherboard. The host OS 201 can also employ virtualization technologies if applicable.

On top of the host OS, the computational instances 202, 203, 204 can execute applications. The computational instance can be virtual containers, virtual machines (VMs) or any other executable code.

The disaggregated DC's architecture differs in a number of aspects as compared to traditional DC architecture.

It has been noted that resource utilization among different logical servers can be low. There is hence a need to improve resource utilization among logical servers.

SUMMARY

It is an object of exemplary embodiments herein to address at least some of the issues outlined above and to efficiently utilize a processing arrangement. This object and others are achieved by a resource sharing manager, a method performed therein, a computer program and computer-readable storage medium, according to the appended independent claims, and by the exemplary embodiments according to the dependent claims.

According to an aspect, the exemplary embodiments provide a method of efficient utilization of a plurality of central processing units, within two or more virtual servers, each virtual server having an operating system. The method is performed in a resource sharing manager that is adapted to manage sharing of said plurality of central processing units within said two or more virtual servers, by interacting with said plurality of central processing units and each operating system of said two or more virtual servers. The method comprising dynamically obtaining information about ownership and sharable status of said plurality of central processing units. The method also comprises dynamically determining which central processing units are sharable to which virtual servers, based on the obtained information about ownership and sharable status. The method also comprises dynamically obtaining information about that one or more of said sharable central processing units are available. The method also comprises dynamically obtaining information about that one or more of said two or more virtual servers require more processing resources. In addition, the method comprises dynamically assigning a first central processing unit of said one or more sharable central processing units being available, to a first virtual server of said one or more virtual servers requiring more resources, based on which central processing units are sharable to which virtual server, providing the information about ownership and sharable status of the first central processing unit, to the OS of the first virtual server. This enables the operating system owning the first virtual server to read a table of processes, and decide which processes to schedule on the first central processing unit, based on the sharable status of the first central processing unit.

According to another aspect, the exemplary embodiments provide a resource sharing manager that is operative to provide efficient utilization of a plurality of central processing units, central processing units, within two or more virtual servers, each virtual server having an operating system. The resource sharing manager is adapted to dynamically obtain information about ownership and sharable status of said plurality of central processing units. The resource sharing manager is adapted to dynamically determine which central processing units are sharable to which virtual servers, based on the obtained information about ownership and sharable status. The resource sharing manager is also adapted to dynamically obtain information about that one or more of said sharable central processing units are available, and to dynamically obtain information about that one or more of said two or more virtual servers require more processing resources. In addition, the resource sharing manager is adapted to dynamically assign a first central processing unit of said one or more sharable central processing units being available, to a first virtual server of said one or more virtual servers requiring more resources, based on which central processing units are sharable to which virtual server, providing the information about ownership and sharable status of the first central processing unit, to the operating system of the first virtual server. This enabling the operating system owning the first virtual server to read a table of processes, and decide which processes to schedule on the first central processing unit, based on the sharable status of the first central processing unit.

According to another aspect, the exemplary embodiments provide a resource sharing manager that is operative to provide efficient utilization of a plurality of central processing units, within two or more virtual servers, each virtual server having an operating system. The resource sharing manager comprises an interface and a controller that is connected to the interface. The interface is adapted to dynamically obtain information about ownership and sharable status of said plurality of central processing units, and to dynamically obtain information about that one or more of said sharable central processing units are available. The controller is also adapted to dynamically obtain information about that one or more of said two or more virtual servers require more processing resources. The controller is adapted to dynamically determine which central processing units are sharable to which virtual servers, based on the obtained information about ownership and sharable status. The controller is also adapted to dynamically assign a first central processing unit of said one or more sharable central processing units being available, to a first virtual server of said one or more virtual servers requiring more resources, based on which central processing units are sharable to which virtual server, providing the information about ownership and sharable status of the first central processing unit, to the operating system of the first virtual server. This enables the operating system owning the first virtual server to read a table of processes, and decide which processes to schedule on the first central processing unit, based on the sharable status of the first central processing unit.

According to yet another aspect, the exemplary embodiments provide a resource sharing manager that is operative to provide efficient utilization of a plurality of central processing units, within two or more virtual servers, each virtual server having an operating system. The resource sharing manager comprises a processing circuit and a memory. The memory has instructions being executable by the processing circuit, wherein said processing circuit when executing said instructions is configured to dynamically obtain information about ownership and sharable status of said plurality of central processing units, and to dynamically determine which central processing units are sharable to which virtual servers, based on the obtained information about ownership and sharable status. The processing circuit, when executing said instructions, is also configured to dynamically obtain information about that one or more of said sharable central processing units are available, and dynamically obtain information about that one or more of said two or more virtual servers require more processing resources. In addition, the processing circuit, when executing said instructions, is also configured to dynamically assign a first central processing units of said one or more sharable central processing units being available, to a first virtual server of said one or more virtual servers requiring more resources, based on which central processing units are sharable to which virtual server, providing the information about ownership and sharable status of the first central processing units, to the operating system of the first virtual server. This enables the operating system owning the first virtual server to read a table of processes, and decide which processes to schedule on the first central processing unit, based on the sharable status of the first central processing unit.

Exemplary embodiments of this disclosure present the following advantages:

It is an advantage that an improved central processing unit utilization is achieved by reducing overhead due to passing through extra management layer (hypervisor) when sharing central processing units within different instances or virtual servers.

Virtual servers can have full control over their dynamically allocated resources, or central processing units, during the time slot that is given to them, which increase security, and prevent different instances, which could time-share central processing unit starve or impact each other's performance.

Subsequent to setting up connections between the resource sharing manager and central processing units, communication may be performed directly via an operating system, i.e. without having to pass a hypervisor layer, which would else cause an unnecessary latency.

The present disclose enables virtual servers, or instances, to allocate a guaranteed amount of resources, without being charged for all, since resources can be shared when not being used.

A further advantage with embodiments of the present disclosure is that an increase in efficiency of task execution is provided, and that a better quality of service in insured.

BRIEF DESCRIPTION OF THE DRAWINGS

Embodiments will now be described in more detail, and with reference to the accompanying drawings, in which.

DETAILED DESCRIPTION

In the following description, exemplary embodiments will be described in more detail, with reference to accompanying drawings. For the purpose of explanation and not limitation, specific details are set forth, such as particular examples and techniques in order to provide a thorough understanding.

As indicated above, resource sharing in existing model is based on hypervisors that introduce additional cost.

Resource sharing for CPU is in practice limited to the CPU resources present within a server. As a result a server cannot use CPU resources from other servers in the DC on demand.

The present disclosure provides a method and a resource sharing manager for implementing a CPU time sharing mechanism rather than using hypervisor-based resource sharing, by dividing CPU resources into sharable states and dedicated states.

Advantages which will become apparent from the description comprise an improved CPU utilization by reducing overhead due to passing through extra management layer (hypervisor) when sharing CPUs within different instances or virtual servers.

Virtual servers can have full control over their dynamically allocated resources (CPUs) during the time slot that is given to them, which increase security, and prevent different instances, which could time-share CPU starve or impact each other's performance.

Subsequent to setting up connections between the resource sharing manager and central processing units, communication may be performed directly via an OS, i.e. without having to pass a hypervisor layer, which would else cause an unnecessary latency.

The present disclose enables virtual servers, or instances, to allocate a guaranteed amount of resources, without being charged for all, since resources can be shared when not being used.

It is emphasized that the embodiments of the present disclosure are advantageous since they provide an increase in efficiency of task execution, and ensures better quality of service.

The solution proposed herein introduces an inventive approach to providing a compute resource sharing from a data center (DC) using hardware resource disaggregation architecture.

Figure 1:
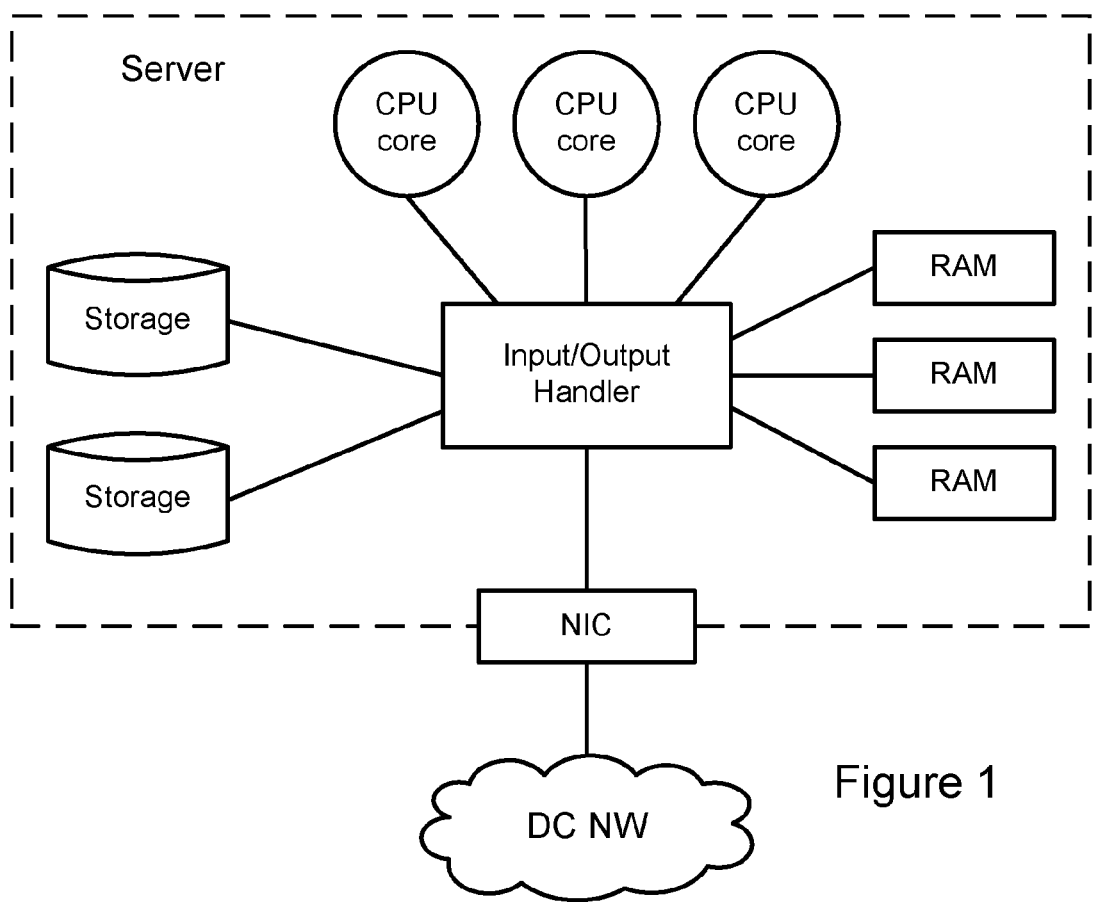
FIG. 1 schematically illustrates a traditional server having various resources.
Figure 2:
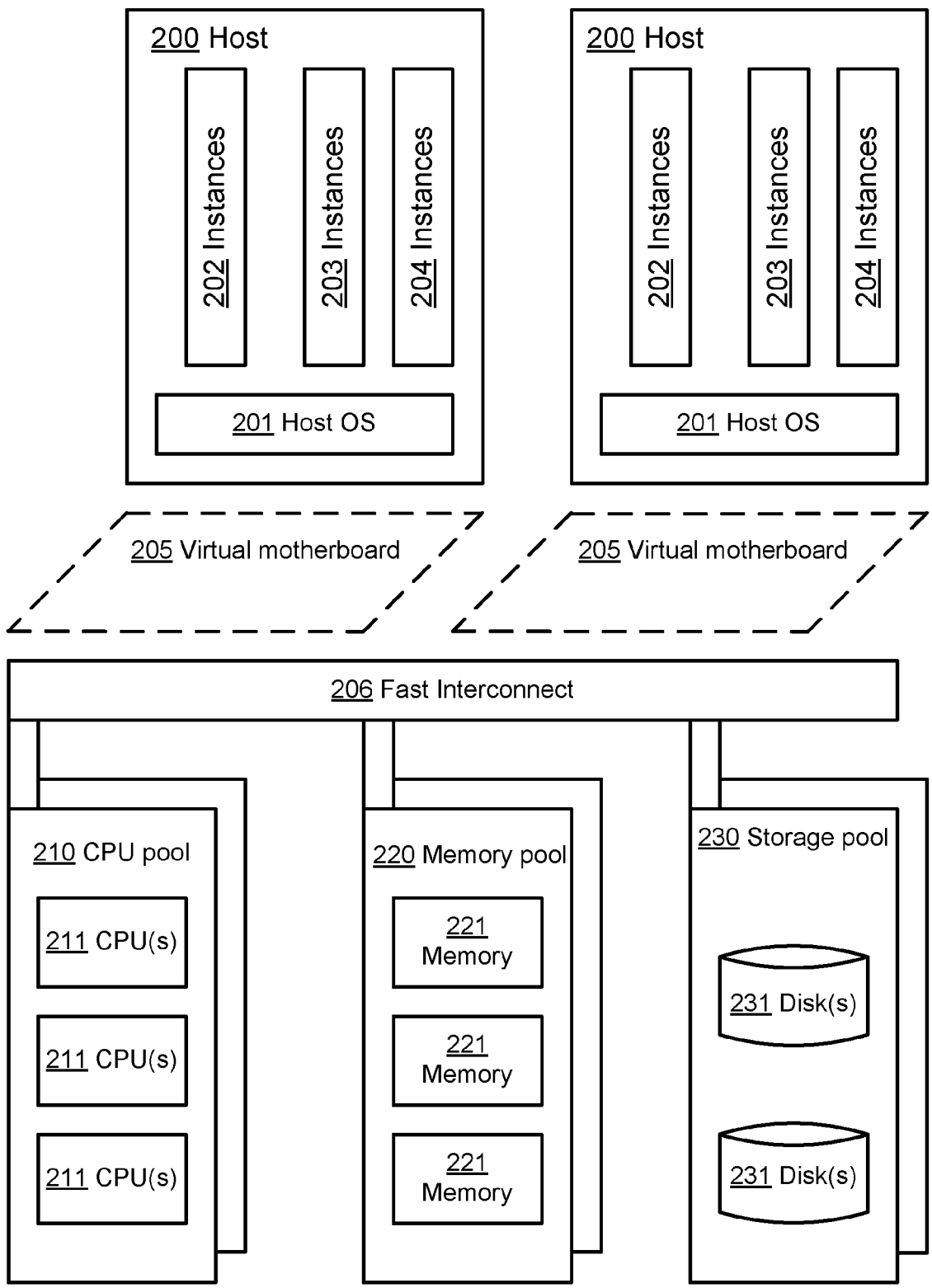
FIG. 2 schematically illustrates system blocks of hardware disaggregated architecture.
Figure 3:
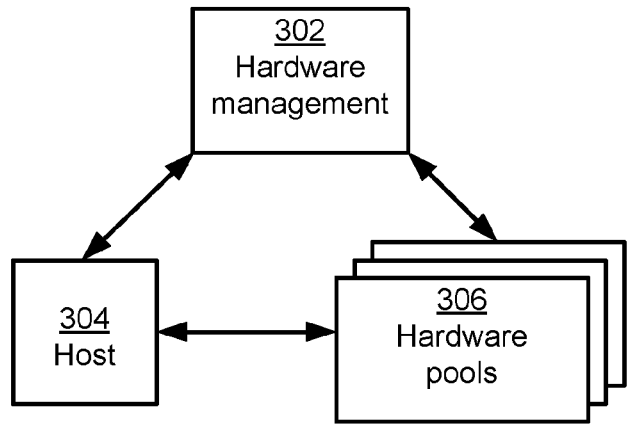
FIG. 3 presents DC interactions related to the present disclosure.

FIG. 3 presents DC interactions related to the present disclosure. The hardware management 302 is responsible for an entire lifecycle management of the DC infrastructure, including operations such as: virtual server composition, including creation, scale up/down, and termination, to mention a few tasks, by interaction with hardware (HW) pools 306. The hardware management 302 is also responsible for the resource sharing manager (RSM), fault detection and prevention, and host setup performance optimization, by interaction with the Host 304.

Figure 4:
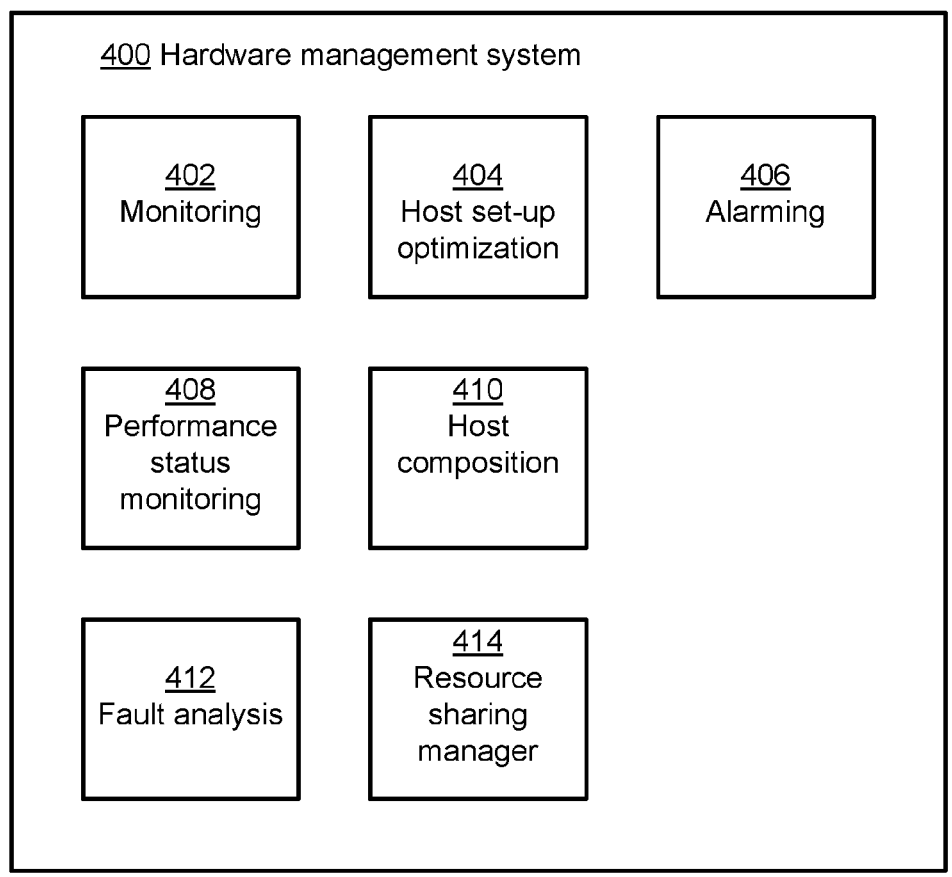
FIG. 4 presents a hardware management system, related to resource sharing management, according to some embodiment of the present disclosure.

FIG. 4 schematically presents a hardware management system 400 with a subset of the internal functionalities/services. The hardware management system 400 comprises: monitoring 402, host set-up optimization 404, alarming 406, performance status monitoring 408, host composition 410, fault analysis 412, and resource sharing management 414.

The functionalities included in this disclosure reside in the resource sharing manager (RSM) 414. It is noted that the RSM 414 may be part of a hardware management system 400, but may alternatively be a stand-alone component.

The RSM may be responsible for dynamically maintaining information about a mapping between instances, or virtual servers, and their CPUs. CPUs may have various sharable states; such as not assigned (or NULL), i.e. not belonging to any virtual server; dedicated, i.e. not sharable, even if not being used and; sharable, i.e. owned by a virtual server but shared to another when not being used.

The information dynamically maintained by RSM is not limited to the above and may be extended by more information, such as shared time window, priority level, etc.

The CPU resources in either the sharable state "not assigned" and "sharable" typically notices the resource sharing manager that they are available when not being used.

Figure 5:
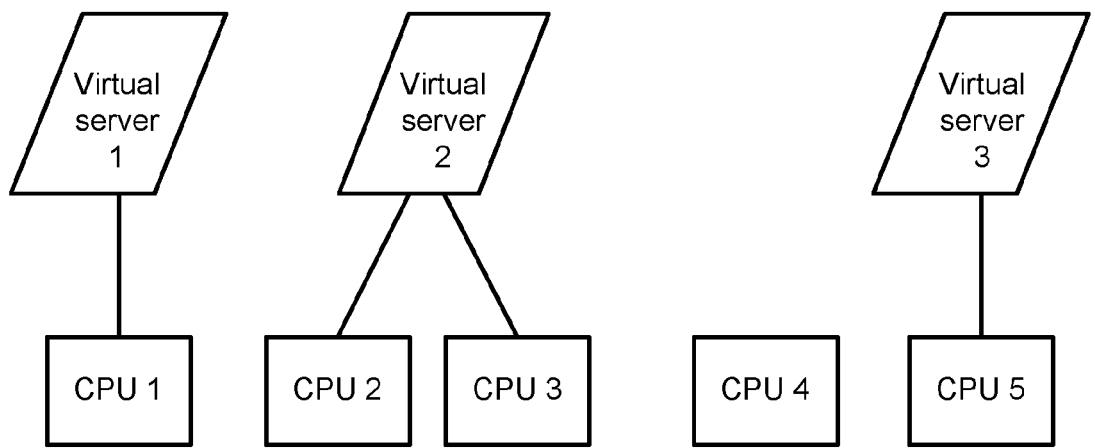
FIGS. 5 to 8 schematically present examples of resource allocation, related to embodiments of the present disclosure.

FIG. 5 schematically presents an example of initial resource allocation of compute pool, related to embodiments of the present disclosure. The compute pool comprises five CPUs, CPU 1, CPU 2, CPU 3, CPU 4 and CPU 5. It is noted that each CPU may comprise one or more CPU cores. From these five CPUs, three virtual servers are composed. Virtual server 1 has, or owns, CPU 1, virtual server 2 has CPU 2 and CPU 3, and virtual server 3 has CPU 5. It is noted that CPU 4 is not assigned to any virtual server.

As CPU 4 is not assigned to any virtual server, the resource sharing manager can decide to assign this resource, i.e. share CPU 4 to any virtual server in need of extra compute resources. The information about the status of each CPU may be provided from each CPU by registration. Alternatively, this information may be obtained by the RSM from monitoring the usage of each CPU.

Figure 6:
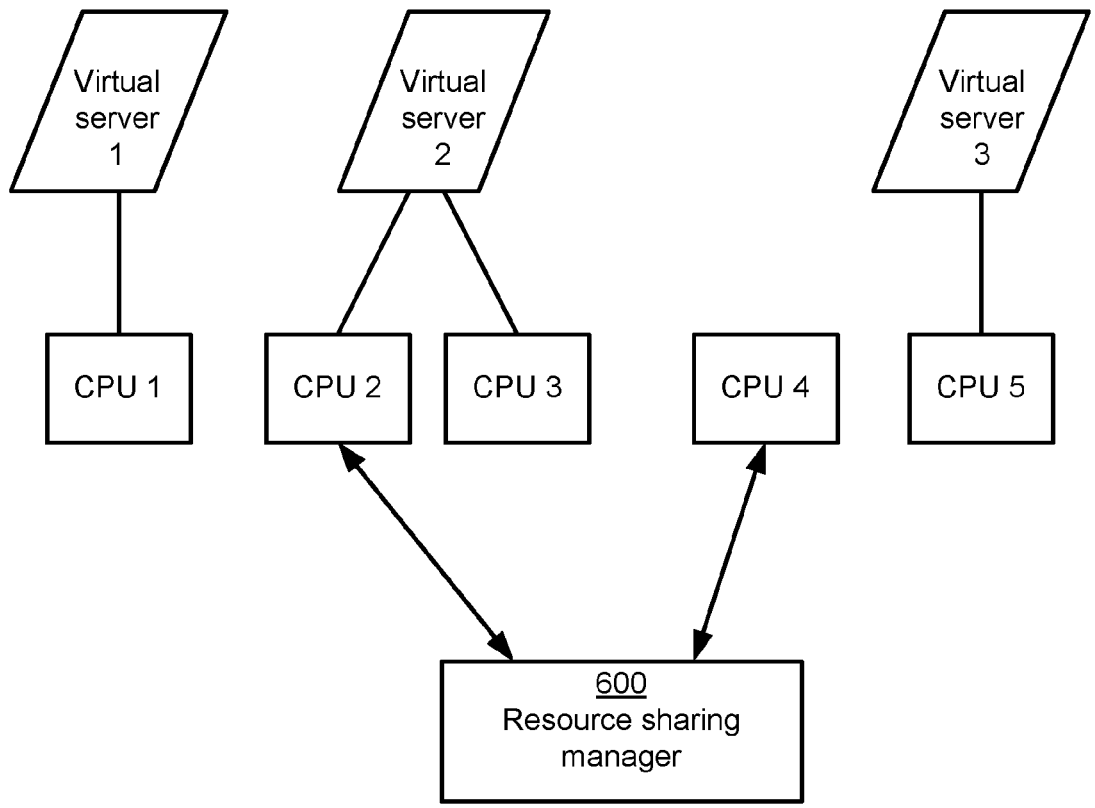

FIG. 6 schematically presents a continuation of the example presented in FIG. 5, of initial resource allocation of compute pool, related to embodiments of the present disclosure. FIG. 6 presents a resource sharing manager 600, being adapted to provide efficient utilization of a plurality of CPUs.

Since virtual server 2 has assigned both CPU 2 and CPU 3, virtual server 2 may donate one of them, to another virtual server, when there is no need for both CPU 2 and CPU 3. In this example, CPU 2 may register with RSM 600. Information about that CPU 2 is available when there is no, or low, load in virtual server 2, may be obtained by RSM 600 from monitoring.

The load may be communicated also to the RSM, alternatively the RSM may detect that the CPU has not been used for a while. FIG. 6 thus presents interactions such as potential registrations by CPU 4 and by CPU 2 with RSM 600.

In order to increase the efficiency of task execution, and ensure better quality of service while utilizing the present disclosure, a further optimization is added to the actions as herein described.

The operating system (OS) can benefit from having information about the status of the CPUs, which the OS currently has access to, in order to be able to schedule processes in a suitable, or right, CPU.

If one OS owns several CPUs at any point of time, it would be valuable to have information about which one is fully dedicated, and which one has been shared. Having such information, the OS can schedule critical tasks in the dedicated CPU, and rest of the tasks, which may be interrupted, in a CPU that is shared, and thus is allowed to be used by another virtual server, or was shared by another virtual server to be accessible by the virtual server in question.

Three sharable states can be identified for CPU in a compute pool. A CPU may be in a not assigned state, in a dedicated state, or in a sharable state.

When being in a not assigned state, the CPU can be shared to any virtual server. In this case a RSM assigns the CPU to a first virtual server that requests more resources. The CPU may be de-assigned when the first virtual server releases it, for instance for the reason that the task with which the CPU was occupied, is completed, or when the RSM decides that it is not used, or alternatively could be potentially used by a another virtual server, or due to any other reason.

In the sharable state, a CPU is owned by a virtual server, say virtual server 1. When not being used by said virtual server 1, when the load is low, the RSM may decide to de-assign the CPU from virtual server 1, and to assign said CPU to another virtual server in need of resources. In this case, once the load within the remaining CPUs of the virtual server 1 increases, the RSM shall assign a CPU, either from any one of available resources or by interrupting one of shared CPUs, i.e. donated, and hence a CPU that is currently being assigned to another virtual server.

In the dedicated state, the CPU is non-sharable, for which reason the RSM will not be involved.

Thus, in order to provide information to an OS about the state of each CPUs, two approaches are presented.

Either a flag or a register may be added to a CPU, for showing the current CPU status. The OS will be able to read such a flag or register directly, for which reason the OS can decide to schedule processes, jobs or tasks based on these flags.

Alternatively, no change is made in the CPU. The OS can have an application programming interface (API) to directly read a table that is updated by the RSM, and gain information about the status of the CPUs in question or which it is having, and use the data to optimize process scheduling.

When using flags, additional CPU flags showing CPU status in relation to a sharable status and ownership may be added to the CPU information. Such information provides the operating system (OS) with information about what kind of CPUs the OS has access to, dedicated or sharable. The RSM is typically responsible to set the value on these flags, enabling the OS running on virtual server to read it.

Figure 7:
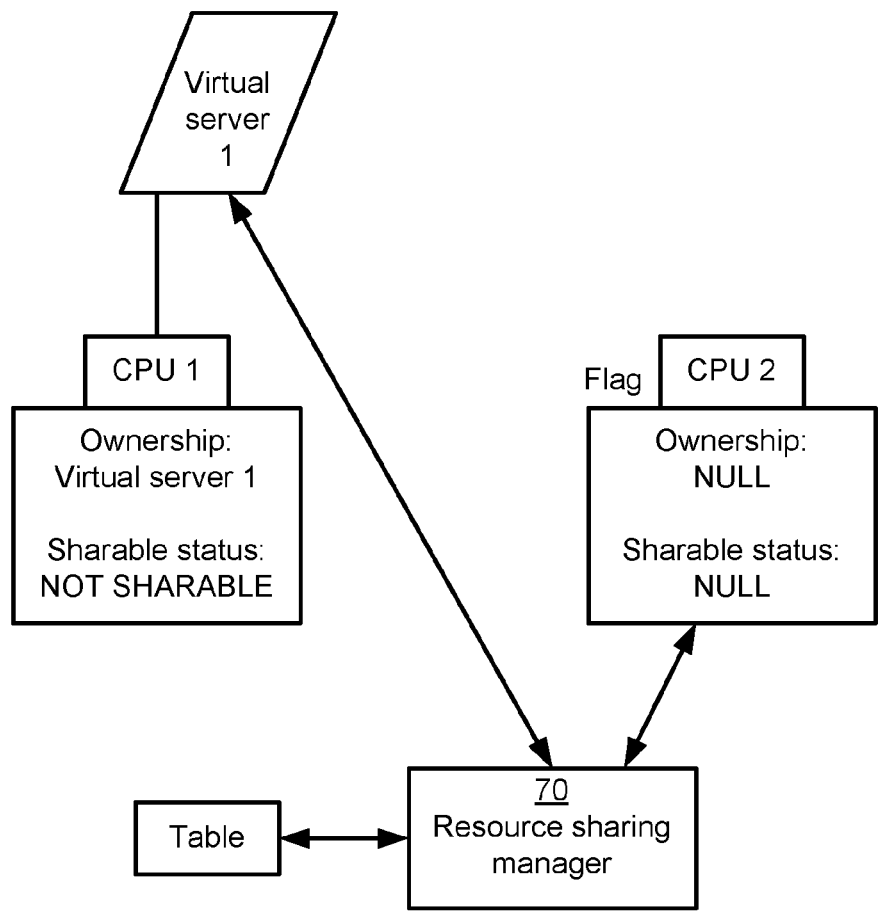

FIG. 7 schematically presents a possible resource allocation scenario within a compute pool, related to embodiments of the present disclosure. The virtual server 1 needs extra resources and RSM 70 identifies an un-used CPU, which is sharable.

CPU 1 is owned by virtual server 1, and has sharable status that is not sharable.

As presented in FIG. 7, RSM 70 receives information that virtual server 1 needs extra compute resources. The RSM may then look into its table to determine whether there are any CPUs, which are sharable. CPU 2 here has ownership: NULL (i.e. not assigned), and sharable status: NULL. In this particular example, RSM 70 therefore identifies that CPU 2 is sharable and can be donated. Subsequently, RSM 70 will update the flag of CPU 2 to "ownership: virtual server 1; sharable status: SHARABLE. Finally, the RSM may call the hardware management system 400 to assign, or attach, CPU 2 to virtual server 1 (not shown in FIG. 7). When the CPU is assigned and running within virtual server 1, then OS can read the CPU 2 flags and decide what type of tasks or jobs should be scheduled on the shared (donated) CPU 2.

Now a similar scenario, will be presented, also using flags to enable an OS owning the virtual server to read a table of processes, and decide which processes to schedule on the CPU, based on the sharable status of the first CPU.

A virtual server 1 owns CPUs, for example, CPU 1 and CPU 2. Flags on these would then indicate "ownership: virtual server 1, sharable status: not sharable i.e. dedicated.

When the RSM receives information about that any of these CPUs are sharable, i.e. can be donate to another virtual server, the RSM updates the flags of one of these CPUs, to "ownership: virtual server 1, sharable status: sharable. The RSM would then maintain this information in its table. This table may well be stored in the database in the RSM.

When another virtual server, let us say virtual server 2, requests for an extra compute resources, the RSM would then consult its table, and determine whether there are any sharable CPUs available. i.e. candidates to be donated to virtual server 2. When the RSM obtains information that CPU 2 is sharable, the RSM may first update the ownership within the flag of CPU 2, to ownership: virtual server 2, sharable status: sharable, in this very example. Subsequently, the RSM may inform or ask the hardware management system to attach, or assign, the CPU 2 to virtual server 2.

It is noted that whenever virtual server 1, when virtual server 1 requires its compute resources back, the virtual server 2 will send information to the RSM about this need. Then the RSM will determine whether there are any sharable resources, such as, CPUs or CPU cores available, to enable the RSM to return the resources previously shared to by the virtual server 1. When the RSM obtains information about an available CPU, the RSM may set the flag of that CPU to ownership: virtual server 1, sharing status: dedicated. The RSM may then assign, or ask the hardware management system to attach, that CPU resource to virtual server 1.

It is noted that if no CPU resources are available in this case, the RSM may interrupt other CPUs that have been shared to, or donated, to other virtual servers to be able to return the resource to virtual server 1.

Now, the other possibility as mentioned above to inform an OS about the status of CPU resources, will be described in more detail. In this case of an application programming interface is used, and no changes on the CPU itself are required. Instead, the RSM provides the OS that is running on a virtual server about the sharable status of a donated CPU, for instance, both ownership and sharable status. Hereby the OS is provided with such information so that the OS has information about what kind of CPU the OS has access to, whether the CPU in question is in dedicated state, or in a sharable state.

Figure 8:
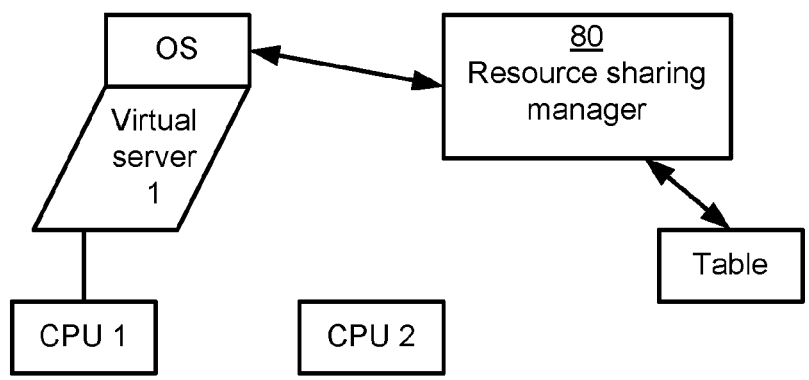

FIG. 8 depicts all resource allocation scenario, in which virtual server 1 needs extra compute resources, and RSM 80 obtains information about that an un-used, therefore available, CPU is sharable, and can hence be donated.

As may be understood from FIG. 8, the RSM may receive information about that virtual server 1 requires extra compute resources. The RSM 80 then consults its table to determine whether there are any CPU that are available and can be donated. In this particular case, the RSM obtains information about that CPU 2 is sharable. Later the RSM may inform the OS running on virtual server 1 that the CPU 2 will be donated, along with information about ownership and sharable status of CPU 2. Alternatively, the OS on top of virtual server 1 may query the RSM 80, at the time the OS determines that a new CPU is attached to the virtual server. Finally, the RSM may inform the hardware management system to attach CPU 2 to virtual server 1, not indicated in FIG. 8. When the CPU resource is attached into virtual server 1, the OS will receive the information about that this CPU. Based on this information, the OS can hence decide what type of jobs or tasks should be scheduled on the CPU, now dynamically shared to the virtual server.

A slightly different scenario, albeit also using an API to provide status information to an OS, will now be presented. In this example, the virtual sever 1 owns the CPUs, for instance, CPU 1 and CPU 2. Then, the RSM receives information about that any one of these CPUs, let us say CPU 2, can be donated. The RSM then updates its table about the status of the corresponding CPU from ownership: virtual server 1, sharable status: not sharable, i.e. dedicated, to ownership: virtual server 1, sharable status: sharable.

At the time when another virtual server, let us say virtual server 2, requests extra resources the RSM again consults its table and determines whether there are any available resources, i.e. any candidates to be donated to virtual sever 2. When RSM obtains information that CPU 2 can be donated, the RSM first then first updates its table with information about CPU 2, in this case, ownership: virtual server 2, sharable status: sharable. The RSM may then provide information to the OS running on virtual server 2 about the status of its newly assigned CPU. Alternatively, at the time when the CPU is attached to virtual server 2, then the OS running on that very virtual server can query the RSM about the status information of the new CPU.

In this case, whenever virtual server 1 determines that it needs its resources back, it will send such information to the RSM. As earlier, the RSM will consult its table and choose one of CPUs and update the information related to that CPU to ownership: virtual server 1, sharable status: dedicated. Then, the RSM may provide information to the OS running on the virtual server 1 about the status of new CPU. Alternatively, the OS can query the RSM when the OS notices that a new CPU is attached to it. Finally, the RSM may ask the hardware management system to attach, i.e. connect that CPU to virtual server 1. It is noted that if there is no information about available CPUs in the RSM table, then the RSM may interrupt one of CPUs donated by virtual server 1, to return back said resource to virtual server 1.

Figure 9:
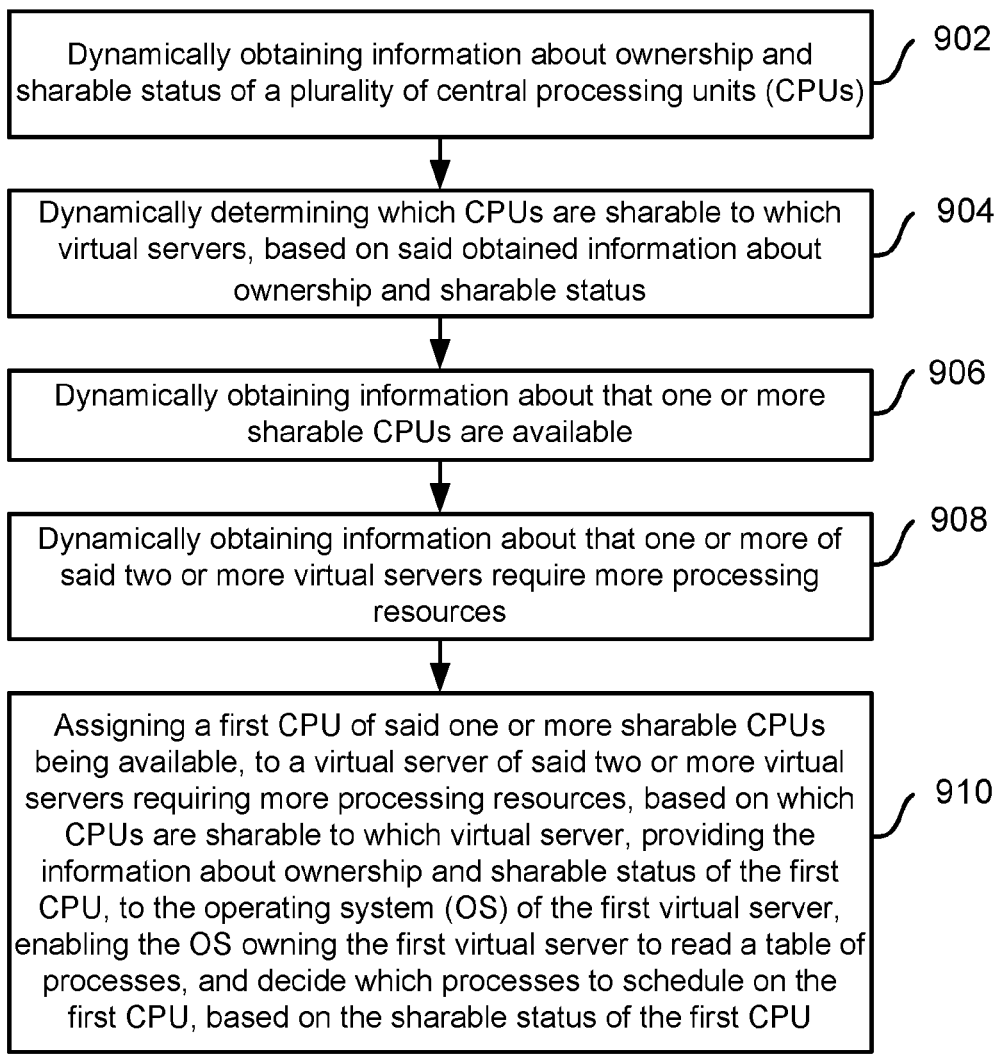
FIG. 9 presents a flow chart of actions in a method of efficient utilization of a plurality of central processing units (CPUs), according to embodiments of the present disclosure.

FIG. 9 presents a flow chart of actions in a method of efficient utilization of a plurality of central processing units (CPUs), within two or more virtual servers, each virtual server having an operating system (OS), according to embodiments of the present disclosure. The method is performed in a resource sharing manager (RSM) that is adapted to manage sharing of said plurality of CPUs within said two or more virtual servers, by interacting with said plurality of CPUs and each OS of said two or more virtual servers. The method comprises the following actions:

Action 902: Dynamically obtaining information about ownership and sharable status of said plurality of CPUs. The sharable status is either "sharable" or "not sharable", where "not sharable" equals to "dedicated".

Action 904: Dynamically determining which CPUs are sharable to which virtual servers, based on the obtained information about ownership and sharable status.

Action 906: Dynamically obtaining information about that one or more of said sharable CPUs are available.

Action 906 may comprise dynamically obtaining information that one or more of said sharable CPUs have, no or substantially low, workload.

Action 906 of obtaining information about that one or more of said sharable CPUs are available, may comprise monitoring workload of said sharable CPUs and identifying when one or more of said sharable CPUs are candidates for donations.

Action 906 of dynamically obtaining information about that one or more of said sharable CPUs are available, may comprise receiving a message from said one or more of said sharable CPUs, registering said one or more of said sharable CPUs as available.

Action 908: Dynamically obtaining information about that one or more virtual servers of said two or more virtual servers require more processing resources.

Action 908 of dynamically obtaining information about that one or more virtual servers of said two or more virtual servers require more processing resources, may comprise monitoring workload of CPUs assigned to said two or more virtual servers and identifying that the workload has increased beyond a workload threshold.

Action 908 of dynamically obtaining information about that one or more virtual servers of said two or more virtual servers require more processing resources, may comprise receiving a message from a CPU assigned to said one or more virtual servers, that the workload of said CPU has increased beyond a workload threshold.

Action 910: Dynamically assigning a first CPU of said one or more sharable CPUs being available, to a first virtual server of said one or more virtual servers requiring more resources, based on which CPUs are sharable to which virtual server. Hereby, the information about ownership and sharable status of the first CPU is provided to the OS of the first virtual server. Said assigning enables the OS owning the first virtual server to read a table of processes, and to decide which processes to schedule on the first CPU, based on the sharable status of the first CPU.

The information about ownership and sharable status of the first CPU may be comprised in a flag. Providing the information about the ownership and sharable status of the first CPU, to the OS of the first virtual server, may comprise providing the flag, enabling the OS to read the flag and thereby also said information about the ownership and sharable status of the first CPU.

Providing the information about the ownership and sharable status of the first CPU, to the OS of the first virtual server, may alternatively comprise informing the OS running on the first virtual server, via an outside application programming interface (API) about the ownership and sharable status of the first CPU.

Action 910 of dynamically assigning a first CPU of said one or more sharable CPUs being available, to a first virtual server of said one or more virtual servers requiring more resources, based on which CPUs are sharable to which virtual server, may comprise assigning the first CPU to the first virtual server of said one or more virtual servers, where the first CPU is owned by a virtual server that is different from the first virtual server.

Action 910 of dynamically assigning a first CPU of said one or more sharable CPUs being available, to a first virtual server of said one or more virtual servers requiring more resources, based on which CPUs are sharable to which virtual server, may comprise assigning a first CPU, having no owner, to the first virtual server of said one or more virtual servers. As mentioned above, said assigning enables the OS owning the first virtual server to read a table of processes, and to decide what processes to schedule on the first CPU, based on the sharable status of the first CPU. The OS may also select a task or job to execute, as a function of the sharable status of the first CPU. The sharable status of the first CPU may in this respect be considered to be a type of the first CPU.

The present disclosure thus comprises a resource sharing manager (RSM) 60, 70, 80, 100, 110, 414 that is operative to provide efficient utilization of a plurality of central processing units (CPUs), within two or more virtual servers, each virtual server having an operating system (OS). The RSM 60, 70, 80, 100, 110, 414 is adapted to dynamically obtain information about ownership and sharable status of said plurality of CPUs, and to dynamically determine which CPUs are sharable to which virtual servers, based on the obtained information about ownership and sharable status. The RSM 60, 70, 80, 100, 110, 414 is also adapted to dynamically obtain information about that one or more of said sharable CPUs are available, and to dynamically obtain information about that one or more of said two or more virtual servers require more processing resources. In addition, the RSM 60, 70, 80, 100, 110, 414 is also adapted to dynamically assign a first CPU of said one or more sharable CPUs being available, to a first virtual server of said one or more virtual servers requiring more resources, based on which CPUs are sharable to which virtual server, providing the information about ownership and sharable status of the first CPU, to the OS of the first virtual server. This enables the OS owning the first virtual server to read a table of processes, and decide which processes to schedule on the first CPU, based on the sharable status of the first CPU.

The information about ownership and sharable status of the first CPU may be comprised in a flag. The RSM may then be adapted to provide the flag, enabling the OS to read the flag and thereby also said information about the ownership and sharable status of the first CPU.

The RSM 414, 60, 70, 80, 100, 110 may alternatively be adapted to inform the OS running on the first virtual server, via an outside application programming interface (API) about the ownership and sharable status of the first CPU.

The RSM 414, 60, 70, 80, 100, 110 may further be adapted to dynamically obtain information about a sharable status of each CPU.

The RSM 414, 60, 70, 80, 100, 110 may also be adapted to dynamically obtain information that one or more of said sharable CPUs have, no or substantially low, workload.

The RSM 414, 60, 70, 80, 100, 110 may further be adapted to either monitor workload of said sharable CPUs and identifying when one or more of said sharable CPUs are candidates for donations, or to receive a message from said one or more of said sharable CPUs, registering said one or more of said sharable CPUs as available.

The RSM 414, 60, 70, 80, 100, 110 may be adapted to dynamically monitor workload of CPUs assigned to said two or more virtual servers and identify that the workload has increased beyond a workload threshold.

The RSM 414, 60, 70, 80, 100, 110 may further be adapted to dynamically receive a message from a CPU assigned to said one or more virtual servers about that the workload of the first CPU has increased beyond a workload threshold.

The RSM 414, 60, 70, 80, 100, 110 may also be adapted to dynamically assign the first CPU to said virtual server of said one or more virtual servers, where the first CPU is owned by a virtual server that is different from the first virtual server.

The RSM 414, 60, 70, 80, 100, 110 may also be adapted to dynamically assign a first CPU, having no owner, to the first virtual server of said one or more virtual servers.

Figure 10:
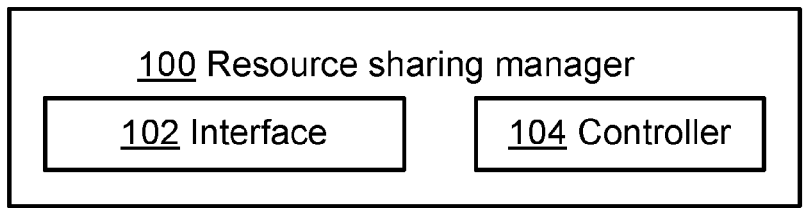
FIGS. 10 and 11 present schematically present a resource sharing manager according to different embodiments of the present disclosure.

FIG. 10 presents a resource sharing manager (RSM) 414, 60, 70, 80, 100, 110 that is operative to provide efficient utilization of a plurality of central processing units (CPUs), within two or more virtual servers, each virtual server having an operating system (OS). The RSM 414, 60, 70, 80, 100, 110 comprises an interface 102 and a controller 104 that is connected to the interface 102.

The interface 102 is adapted to dynamically obtain information about ownership and sharable status of said plurality of CPUs, and to dynamically obtain information about that one or more of said sharable CPUs are available. The interface is also adapted to dynamically obtain information about that one or more of said two or more virtual servers require more processing resources.

The controller 104 is adapted to dynamically determine which CPUs are sharable to which virtual servers, based on the obtained information about ownership and sharable status. The controller 104 is also adapted to dynamically assign a first CPU of said one or more sharable CPUs being available, to a first virtual server of said one or more virtual servers requiring more resources, based on which CPUs are sharable to which virtual server, enabling the first virtual server of said one or more virtual servers to which the first CPU is assigned, to use the first CPU, until the RSM 414, 60, 70, 80, 100, 110 being adapted to receive information that the first CPU no longer is sharable to, or needed by, the first virtual server, receives such information.

Figure 11:
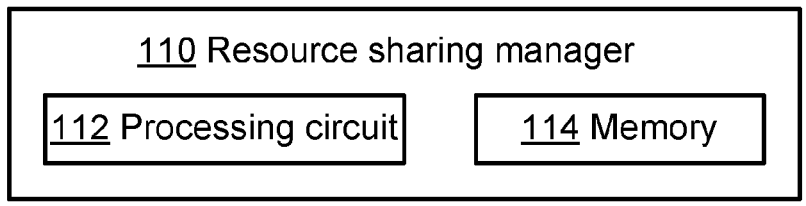

FIG. 11 presents a resource sharing manager (RSM) 414, 60, 70, 80, 100, 110 that is operative to provide efficient utilization of a plurality of central processing units (CPUs), within two or more virtual servers, each virtual server having an operating system (OS). The RSM 414, 60, 70, 80, 100, 110 comprises a processing circuit 112 and a memory 114. The memory 114 has instructions being executable by the processing circuit 112, wherein said processing circuit 112, when executing said instructions, is configured to dynamically obtain information about ownership and sharable status of said plurality of CPUs, and to dynamically determine which CPUs are sharable to which virtual servers, based on the obtained information about ownership and sharable status. The processing circuit 112, when executing said instructions, is configured to dynamically obtain information about that one or more of said sharable CPUs are available, and to dynamically obtain information about that one or more of said two or more virtual servers require more processing resources. In addition, the processing circuit 112, when executing said instructions, is also configured to dynamically assign a first CPU of said one or more sharable CPUs being available, to a first virtual server of said one or more virtual servers requiring more resources, based on which CPUs are sharable to which virtual server, providing the information about ownership and sharable status of the first CPU, to the OS of the first virtual server. This enables the OS owning the first virtual server to read a table of processes, and decide which processes to schedule on the first CPU, based on the sharable status of the first CPU.

The present disclosure also comprises a computer program for providing efficient utilization of a plurality of CPUs. This computer program comprises instructions which, when executed on at least one processor, cause the at least one processor to carry out the actions as presented in the flow chart of FIG. 9, for efficient utilization of a plurality of CPUs. This disclosure also comprises a computer-readable storage medium having thereon this computer program.

Exemplary embodiments as described herein have the following advantages:

It is advantageous that an improved CPU utilization is achieved by reducing overhead due to passing through extra management layer (hypervisor) when sharing CPUs within different instances or virtual servers.

Virtual servers can have full control over their dynamically allocated resources (CPUs) during the time slot that is given to them, which increase security, and prevent different instances, which could time-share CPU starve or impact each other's performance.

Subsequent to setting up connections between the resource sharing manager and central processing units, communication may be performed directly via an OS, i.e. without having to pass a hypervisor layer, which would else cause an unnecessary latency.

The present disclose enables virtual servers, or instances, to allocate a guaranteed amount of resources, without being charged for all, since resources can be shared when not being used.

It is emphasized that the embodiments of the present disclosure are advantageous since they provide an increase in efficiency of task execution, and ensures better quality of service.

It may be further noted that the above described embodiments are only given as examples and should not be limiting to the present exemplary embodiments, since other solutions, uses, objectives, and functions are apparent within the scope of this invention according to the accompanying patent claims.

ABBREVIATIONS

CPU central processing unit
DC data center
FPGA field programmable gate array
NIC network interface card
OS operating system
RAM random access memory
VM virtual machine

The invention claimed is:

1. A method of efficient utilization of a plurality of central processing units (CPUs) within two or more virtual servers, each virtual server having an operating system (OS), the method being performed in a resource sharing manager (RSM) being adapted to manage sharing of said plurality of CPUs within said two or more virtual servers, by interacting with said plurality of CPUs and each OS of said two or more virtual servers, the method comprising:
dynamically obtaining information about ownership and sharable status of said plurality of CPUs;
dynamically determining which CPUs are sharable to which virtual servers, based on the obtained information about ownership and sharable status;
dynamically obtaining information about that one or more of said sharable CPUs are available;
dynamically obtaining information about that one or more of said two or more virtual servers require more processing resources;
dynamically assigning a first CPU of said one or more sharable CPUs being available, to a first virtual server of said one or more virtual servers requiring more processing resources, based on which CPUs are sharable to which virtual server;
providing the information about ownership and sharable status of the first CPU, to the OS of the first virtual server; and
enabling the OS owning the first virtual server to read a table of processes, and decide which processes to schedule on the first CPU, based on the sharable status of the first CPU, wherein
dynamically assigning the first CPU of said one or more sharable CPUs being available, to the first virtual server of said one or more virtual servers requiring more processing resources, based on which CPUs are sharable to which virtual server, comprises assigning the first CPU to the first virtual server of said one or more virtual servers, where (i) the first CPU is owned by a virtual server that is different from the first virtual server or (ii) the first CPU has no owner.

2. The method according to claim 1, wherein
the information about ownership and sharable status of the first CPU is comprised in a flag, and
providing the information about the ownership and sharable status of the first CPU, to the OS of the first virtual server, comprises providing the flag, thereby enabling the OS of the first virtual server to read the flag.

3. The method according to claim 1, wherein the sharable status indicates whether a CPU is either sharable or not sharable, where a CPU being not sharable indicates that the CPU is dedicated.

4. The method according to claim 1, wherein dynamically obtaining information about that one or more of said sharable CPUs are available comprises obtaining information that one or more of said sharable CPUs have, no or substantially low, workload.

5. The method according to claim 1, wherein dynamically obtaining information about that one or more virtual servers of said two or more virtual servers require more processing resources, comprises monitoring workload of CPUs assigned to said two or more virtual servers and identifying that the workload has increased beyond a workload threshold.

6. The method according to claim 1, wherein dynamically obtaining information about that one or more of said two or more virtual servers require more processing resources, comprises receiving a message from a CPU assigned to said one or more virtual servers, indicating that the workload of said CPU has increased beyond a workload threshold.

7. A computer program product comprising a non-transitory computer-readable storage medium having thereon a computer program which comprises instructions which, when executed on at least one processor, cause the at least one processor to carry out the method according to claim 1.

8. A resource sharing manager (RSM) operative to provide efficient utilization of a plurality of central processing units (CPUs) within two or more virtual servers, each virtual server having an operating system (OS), the RSM being adapted to:
dynamically obtain information about ownership and sharable status of said plurality of CPUs;
dynamically determine which CPUs are sharable to which virtual servers, based on the obtained information about ownership and sharable status;
dynamically obtain information about that one or more of said sharable CPUs are available;
dynamically obtain information about that one or more of said two or more virtual servers require more processing resources; and
dynamically assign a first CPU of said one or more sharable CPUs being available, to a first virtual server of said one or more virtual servers requiring more processing resources, based on which CPUs are sharable to which virtual server;

provide the information about ownership and sharable status of the first CPU, to the OS of the first virtual server; and enable the OS owning the first virtual server to read a table of processes, and decide which processes to schedule on the first CPU, based on the sharable status of the first CPU, wherein dynamically assigning the first CPU of said one or more sharable CPUs being available, to the first virtual server of said one or more virtual servers requiring more processing resources, based on which CPUs are sharable to which virtual server, comprises assigning the first CPU to the first virtual server of said one or more virtual servers, where (i) the first CPU is owned by a virtual server that is different from the first virtual server or (ii) the first CPU has no owner.

9. The RSM according to claim 8, wherein the information about ownership and sharable status of the first CPU is comprised in a flag, and the RSM is adapted to provide the flag, thereby enabling the OS of the first virtual server to read the flag.

10. The RSM according to claim 8, further being adapted to inform the OS running on the first virtual server, via an outside application programming interface (API) about the ownership and sharable status of the first CPU.

11. The RSM according to claim 8, further being adapted to dynamically obtain information about a sharable status of each CPU.

12. The RSM according to claim 8, further being adapted to dynamically obtain information that one or more of said sharable CPUs have, no or substantially low, workload.

13. The RSM according to claim 8, further being adapted to either monitor workload of said sharable CPUs and identify when one or more of said sharable CPUs are candidates for donations, or to receive a message from said one or more of said sharable CPUs, registering said one or more of said sharable CPUs as available.

14. The RSM according to claim 8, further being adapted to dynamically monitor workload of CPUs assigned to said two or more virtual servers and identify that the workload has increased beyond a workload threshold.

15. The RSM according to claim 8, further being adapted to dynamically receive a message from a CPU assigned to said one or more virtual servers about that the workload of the first CPU has increased beyond a workload threshold.

16. A resource sharing manager (RSM) operative to provide efficient utilization of a plurality of central processing units (CPUs), within two or more virtual servers, each virtual server having an operating system (OS), the RSM comprising:

a processing circuit; and a memory having instructions executable by the processing circuit, wherein said processing circuit when executing said instructions is configured to:

dynamically obtain information about ownership and sharable status of said plurality of CPUs;

dynamically determine which CPUs are sharable to which virtual servers, based on the obtained information about ownership and sharable status;

dynamically obtain information about that one or more of said sharable CPUs are available;

dynamically obtain information about that one or more of said two or more virtual servers require more processing resources; and dynamically assign a first CPU of said one or more sharable CPUs being available, to a first virtual server of said one or more virtual servers requiring more processing resources, based on which CPUs are sharable to which virtual server, providing the information about ownership and sharable status of the first CPU, to the OS of the first virtual server, enabling the OS owning the first virtual server to read a table of processes, and decide which processes to schedule on the first CPU, based on the sharable status of the first CPU, wherein dynamically assigning the first CPU of said one or more sharable CPUs being available, to the first virtual server of said one or more virtual servers requiring more processing resources, based on which CPUs are sharable to which virtual server, comprises assigning the first CPU to the first virtual server of said one or more virtual servers, where (i) the first CPU is owned by a virtual server that is different from the first virtual server or (ii) the first CPU has no owner.

* * * * *